Patented June 24, 1952

2,601,635

UNITED STATES PATENT OFFICE 2,601,635

PROCESS FOR EXTRACTING AROMATIC OILS FROM VANILLA BEANS

Lucien Romagnan, Nice, Alpes Maritimes, France, assignor to Andrée Romagnan, née (born) Sauvigne, Nice, Alpes-Maritimes, France No Drawing. Application July 18, 1949, Serial No. 105,458. In France July 26, 1948

5 Claims. (Cl. 99—140)

This invention relates to the separation of aromatic oils and essential oils from their natural carriers.

It is an object of my invention considerably to shorten the time required to extract aromatic and essential oils from such carriers, and thus to obtain large amounts of oils very rapidly.

A further object is readily to obtain concentrated dispersions (including solutions) of aromatic and essential oils that can be employed directly, from natural carriers thereof, in particular highly concentrated dispersions in water and alcohol, infusions and tinctures.

According to this invention, I provide a process which comprises subjecting said natural carriers to the action of supersonic radiations so as to cause disintegration of the carriers by reason of a known phenomenon of resonance.

As natural supports that can be treated in accordance with my invention, I may mention:

(a) Citrus fruits such as lemon, orange, bergamot, tangerine and citron or pulpy fruits such as apricot;

(b) Flowers such as roses, pinks, jessamine and so on;

(c) Seeds, pods, beans or roots such as vanilla beans, tonka-beans, olives, peanuts and so on.

According to the preferred procedure, after removing worthless parts from the natural carriers I subject said carriers to a mechanical comminution for example by crushing, powdering or grinding, then I expose the material thus finely divided to supersonic radiations. Under the influence of the radiations, the vegetable cells burst, releasing aromatic or essential oil globules with which they are stuffed. I select the power and wave length of the radiations in accordance with the material to be treated, and as a rule I dart the radiation beam as a sheet or a narrow pencil on the comminuted natural carriers.

The proper time of exposure whereby optima conditions for extracting aromatic or essential oils are secured (i. e. whereby too violent or too prolonged cavitation phenomena likely to cause incipient decomposition of oils to be collected, are avoided) can be determined by experiments. It is further desirable to prevent too high a rise of temperature as a consequence of mechanical energy being absorbed, because such a temperature rise would be detrimental to the scent of the products obtained.

In order to meet the last-named object, I may limit the period through which the carriers are subjected to supersonic irradiation, or make provision to cool the extracting vessel.

The extraction according to this invention may be effected in a gaseous, liquid or pasty medium, either under atmospheric pressure or, as the case may be, under a super-atmospheric or a subatmospheric pressure. In the case of a gaseous medium, I prefer to operate in an atmosphere which is not capable of reacting with the products to be obtained. Thus, for example, since air oxygen is likely to destroy certain oils, it is advantageous in some cases to operate in an inert gas such as nitrogen, hydrogen or carbon dioxide. When the treatment is effected in a gaseous medium, the products fall from the carriers and are collected at the bottom of the extracting zone in a suitable receiver.

It is also possible to operate in a liquid medium, provided said medium is not capable of being disintegrated by supersonic radiations and can transmit such radiations. As a liquid medium, a solvent for the product to be extracted may be employed, in which case the medium will cooperate with the supersonic radiations to effect extraction; a liquid which is not a solvent for the product to be extracted may also be employed, and then the product will be obtained as an emulsion or dispersion in said liquid. As a matter of fact the stirring of liquid by supersonics and the release of the product as globules coact to produce emulsions. The product is separated subsequently from the liquid medium by usual procedures, viz, by settling and decanting, filtering, centrifuging or as the case may be distilling in a vacuo.

The liquid medium may be water or an oil or a fat which is fluid enough to soak the natural carriers thoroughly. With a view to facilitating subsequent separation by mechanical means, it is desirable to employ a medium having a specific gravity different from that of the product to be obtained.

A pasty, soaking or coating medium such as a set grease or fat may also be employed to obtain a next to solid emulsion or solution.

The process may be carried out batchwise by periodically placing natural carrier batches to be treated in extracting vessels, or it may be carried out continuously by employing conveying means that move the natural carriers slowly, without interruption, in close proximity to a supersonic projector. It is particularly desirable to employ a liquid stream in which natural carriers are submerged, as conveying means for such carriers.

The relative proportion of liquid medium and comminuted natural carriers varies according to the carriers, and the desired concentration for the dispersion of oils in said medium; it must be large enough to cause the carrier bits to be submerged, but it is generally useless to employ an amount of liquid medium in considerable excess over the amount required for submersion as this would result in increased expenses for evaporating or distilling excess liquid medium from the dispersion.

As to the frequency of the supersonic vibrations, I have tested frequencies from 19,000 to 960,000 periods successfully. Frequencies of 19,000–20,000 periods per second are generally preferred, chiefly for the sake of convenience and availability of flexible, strong apparatuses capable of producing radiations having such frequencies.

The following examples will better show how my invention may be carried out, it being understood that they are given merely for the sake of illustration of a treatment of two typical, different starting materials but my invention is not limited thereto.

*Example 1.*—I employed a supersonic emitting apparatus operated with alternating current (110 volts, 50 periods) absorbing a maximum power of 1250 watts from the mains. The apparatus energized a magneto-striction projector producing a frequency of 19,000 periods per second with a power of about 20 watts.

The projector comprised a metal bar transmitting supersonic vibrations to the medium to be treated; in use, it was either employed as a support for the vessels in which extraction was carried out, or dipped in the vessels. The vessels, like the bar, were cylindrical and were capable of holding approximately 4 to 5 litres.

Previously divided vanilla beans were placed in an extracting vessel and covered with the liquid selected; it was either natural water, or water having a variable alcohol content according to the nature of the desired product. In a vessel thus charged, the vibration transmitting bar was dipped to the bottom.

The apparatus was started. After 10 to 15 minutes, the liquid has been laden with vanilla aromatic components and assumed a dark brown color; temperature had risen by only a few degrees.

With a view to exhausting vanilla bean chips as thoroughly as possible, it was found advisable to effect a so-called systematic or methodic exhaustion, i. e. to contact fresh extracting liquid with chips that have already been contacted twice or three times with extracting liquid, and to employ extracting liquid which has already been contacted twice or three times with vanilla beans for extraction of aromatic and essential oils from fresh vanilla bean chips. Liquids thus charged with extracted oils were joined together, decanted and filtered.

I could thus obtain:
(a) Water dispersions containing 150 parts by weight of vanilla extract
1000 parts by weight of water Such a water dispersion could be employed in ice-creams and cakes in the proportion of one per cent.

(b) Alcohol-water dispersions in which the continuous phase comprised from 1 to 96 per cent by volume of alcohol.

(c) Substantially anhydrous extracts by contacting bean chips with as little water as possible for transmitting ultrasounds and exhausting them by successive contacts as above described (fresh beans being contacted with water already laden with oils) then evaporating water from the aqueous dispersions to obtain vanilla oleoresins.

*Example 2.*—Lemons were treated in the same way as set forth in Example 1, except that:

1. Fresh lemons were immersed in water for about 24 hours to soften the rind thereof.
2. They were peeled thereafter, the peels being cut to as small bits as possible.

With a view to producing water-alcohol dispersions, finely divided lemon peels were placed in an extracting vessel, and water containing 15 per cent by volume of alcohol was added thereto. I used as an average 1 litre of alcoholic water for peels from 6 to 10 lemons. After exposure to supersonic radiations and systematic exhaustion as described in Example 1, the aqueous dispersions were joined together, decanted and filtered to be freed from white particles of mesoderm that were torn off by ultrasounds.

Water-alcohol dispersions thus produced are preferred for incorporation in ice-creams.

With a view to obtaining lemon essential oil, I employed as little water (without alcohol) as possible for extraction, and after systematic exhaustion of the peels, I joined the aqueous dispersions together and distilled them, preferably in a vacuo. After decanting the distillate, I obtained lemon essential oil.

I claim:

1. In a process for extracting aromatic oils from vanilla beans, the steps of setting up supersonic vibrations of a frequency of at least 19,000 periods per second in a supersonic wave transmitting liquid medium containing divided vanilla beans to cause said aromatic oils to pass from said beans into said liquid medium; and thereafter separating said beans from said liquid medium.

2. In a process for extracting aromatic oils from vanilla beans, the steps of maintaining supersonic vibrations of a frequency of about 19,000–22,000 periods per second for a period of about 10–15 minutes in a supersonic wave transmitting liquid medium containing divided vanilla beans to cause said aromatic oils selectively to be transferred from said beans into said liquid medium; and thereafter separating said beans from said liquid medium.

3. The process of claim 2, the liquid medium being aqueous.

4. The process of claim 2, the liquid medium substantially consisting of water and ethyl alcohol.

5. The process of claim 2, the liquid medium substantially consisting of water, the process further comprising the step of dehydrating said liquid medium after said separating step, to obtain vanilla oleo-resin.

LUCIEN ROMAGNAN.

REFERENCES CITED

The following references are of record in the file of this patent:

UNITED STATES PATENTS

| Number | Name | Date |
|---|---|---|
| 775,502 | Sheehan | Nov. 22, 1904 |
| 1,010,043 | Gowen | Nov. 28, 1911 |
| 1,814,888 | Bennett | July 14, 1931 |
| 1,992,938 | Chambers et al. | Mar. 5, 1935 |
| 2,098,110 | Schertz et al. | Nov. 2, 1937 |
| 2,407,462 | Whitely | Sept. 10, 1946 |
| 2,473,453 | Shropshire | June 14, 1949 |